(12) United States Patent
Lee et al.

(10) Patent No.: US 12,294,111 B2
(45) Date of Patent: May 6, 2025

(54) SUBSTRATE FOR SEPARATOR OF ELECTROCHEMICAL DEVICE, SEPARATOR INCLUDING SAME, AND METHOD OF FORMING BATTERY CELL SEPARATOR

(71) Applicant: LG ENERGY SOLUTION, LTD., Seoul (KR)

(72) Inventors: So-Yeong Lee, Daejeon (KR); Kyeong-Hui Bae, Daejeon (KR); So-Mi Jeong, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 0 days.

(21) Appl. No.: 17/980,813

(22) Filed: Nov. 4, 2022

(65) Prior Publication Data
US 2023/0268614 A1  Aug. 24, 2023

(30) Foreign Application Priority Data
Feb. 23, 2022  (KR) .................. 10-2022-0023883

(51) Int. Cl.
| | |
|---|---|
| *H01M 50/417* | (2021.01) |
| *H01M 50/403* | (2021.01) |
| *H01M 50/44* | (2021.01) |
| *H01M 50/491* | (2021.01) |
| *H01M 50/494* | (2021.01) |
| *H01M 50/497* | (2021.01) |

(52) U.S. Cl.
CPC ......... *H01M 50/417* (2021.01); *H01M 50/44* (2021.01); *H01M 50/491* (2021.01); *H01M 50/494* (2021.01); *H01M 50/497* (2021.01); *H01M 50/403* (2021.01)

(58) Field of Classification Search
None
See application file for complete search history.

(56) References Cited

U.S. PATENT DOCUMENTS

| 5,922,492 A | 7/1999 | Takita et al. |
|---|---|---|
| 2014/0272533 A1 | 9/2014 | Shi et al. |
| 2017/0133654 A1* | 5/2017 | Cho ............... C09D 179/08 |
| 2017/0341035 A1 | 11/2017 | Sato et al. |

(Continued)

FOREIGN PATENT DOCUMENTS

| EP | 3 950 789 A1 | 2/2022 |
|---|---|---|
| JP | 2004149637 A * | 5/2004 |
| JP | 2015-120786 A | 7/2015 |

(Continued)

OTHER PUBLICATIONS

English translation of Sato et al. (JP-2015120786-A). (Year: 2015).*

(Continued)

*Primary Examiner* — Jonathan G Leong
*Assistant Examiner* — Drew C Newman
(74) *Attorney, Agent, or Firm* — Birch, Stewart, Kolasch & Birch, LLP

(57) ABSTRACT

A separator substrate for an electrochemical device. The separator substrate has pores that are small and uniform in size, good physical strength and durability, and high dielectric breakdown voltage. Therefore, with the use of the separator substrate, the probability of short circuiting is low.

10 Claims, 3 Drawing Sheets

(56) References Cited

U.S. PATENT DOCUMENTS

2018/0053963 A1* 2/2018 Tanaka .............. H01M 10/0525
2022/0021078 A1 1/2022 Lee et al.

FOREIGN PATENT DOCUMENTS

| | | |
|---|---|---|
| JP | 6458015 B2 | 1/2019 |
| JP | 2019-175703 A | 10/2019 |
| JP | 6729391 B2 | 7/2020 |
| JP | 2021-123614 A | 8/2021 |
| KR | 10-0452784 B1 | 6/2005 |
| KR | 10-2016-0002447 A | 1/2016 |
| KR | 10-2017-0041194 A | 4/2017 |
| KR | 10-2017-0101288 A | 9/2017 |
| KR | 10-2018-0055277 A | 5/2018 |
| KR | 10-2005868 B1 | 7/2019 |
| KR | 10-2020-0000372 A | 1/2020 |
| KR | 10-2020-0056799 A | 5/2020 |
| KR | 10-2020-0060353 A | 5/2020 |
| KR | 10-2020-0065814 A | 6/2020 |
| KR | 10-2226140 B1 | 3/2021 |
| KR | 10-2252645 B1 | 5/2021 |
| KR | 10-2021-0148126 A | 12/2021 |
| KR | 10-2354780 B1 | 1/2022 |
| KR | 10-2022-0021750 A | 2/2022 |
| WO | WO2012/102241 A1 | 8/2012 |
| WO | WO2014/136799 A1 | 9/2014 |

OTHER PUBLICATIONS

English translation of Kobayashi et al. (JP-2004149637-A). (Year: 2004).*

* cited by examiner

[FIG. 1]
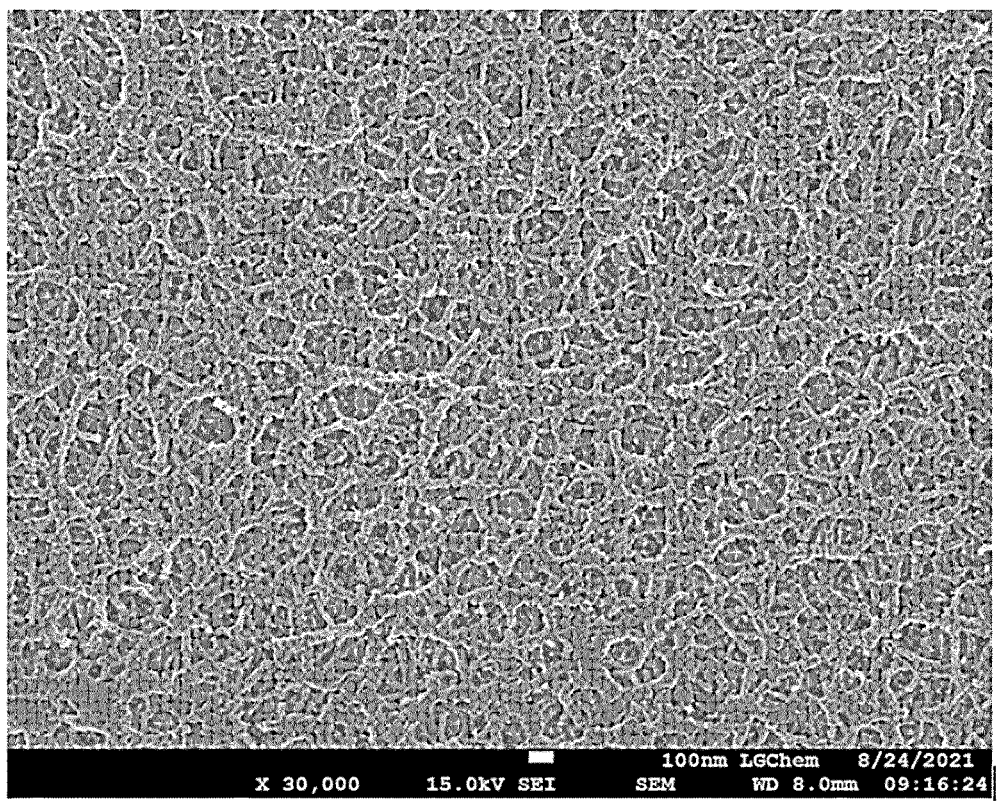

[FIG. 2]
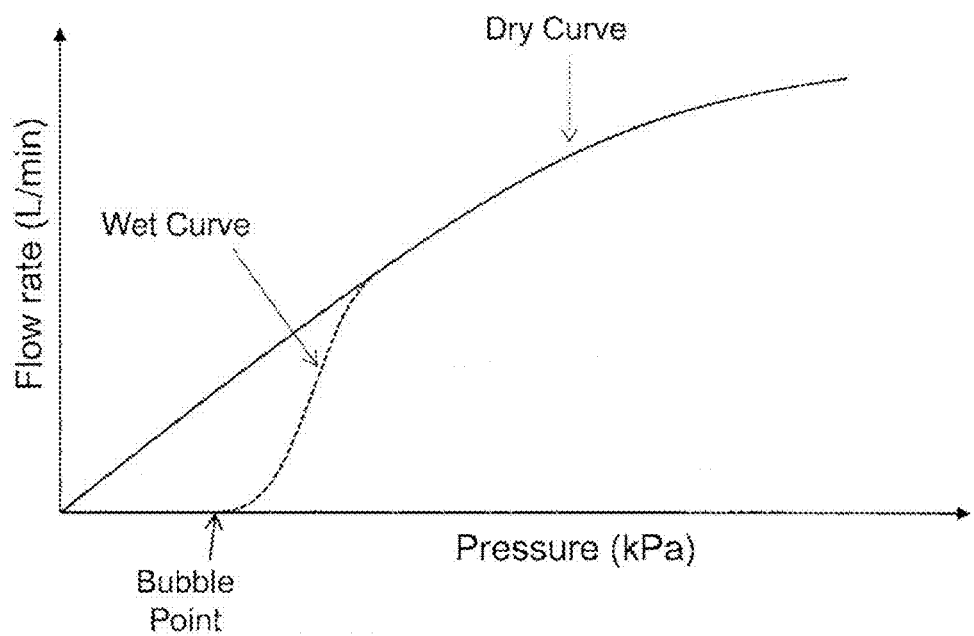

[FIG. 3]
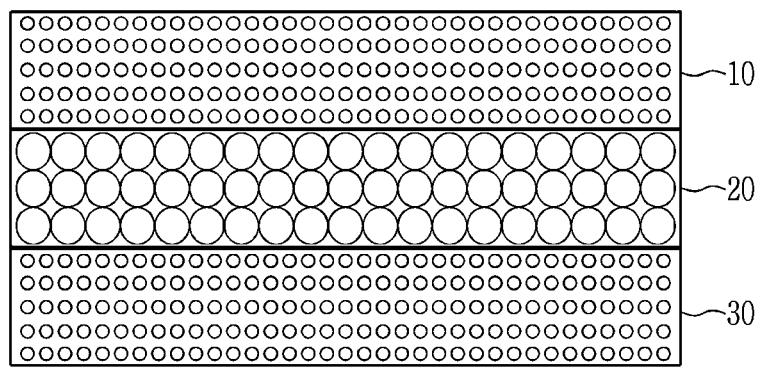

SUBSTRATE FOR SEPARATOR OF ELECTROCHEMICAL DEVICE, SEPARATOR INCLUDING SAME, AND METHOD OF FORMING BATTERY CELL SEPARATOR

CROSS REFERENCE TO RELATED APPLICATION

The present application claims priority to Korean Patent Application No. 10-2022-0023883, filed on Feb. 23, 2022, the entire contents of which are herein expressly incorporated by reference.

BACKGROUND OF THE INVENTION

1. Field of the Invention

The present disclosure relates to a substrate for a separator of an electrochemical device having excellent withstand voltage characteristics and to a separator including the same.

2. Description of the Related Art

Polyolefin microporous membranes are widely used for separators for batteries such as lithium batteries, diaphragms for electrolytic capacitors, moisture-permeable waterproof clothing, various filtration membranes, and the like. When such a polyolefin microporous membrane is used a battery separator, its performance is closely related to battery characteristics, productivity, and safety. Therefore, in particular, lithium ion battery separators are required not only to have excellent mechanical properties and permeability but also to have a shutdown function (shutdown characteristic), thermal shrinkage resistance, etc. The shutdown function refers a function of stopping a battery reaction by an action in which pores of the separator are closed due to abnormal heat to prevent battery heat generation, ignition, and rupture accidents caused by short circuiting of external circuits or overcharging. Thermal shrinkage resistance means the ability to maintain the shape of the separator even at high temperatures to prevent a dangerous situation in which the positive electrode material and the negative electrode material directly react.

In general, a microporous membrane made of only polyethylene has a low meltdown temperature, and a microporous membrane made of only polypropylene has a high shutdown temperature. Accordingly, a battery separator including a microporous film made of polyethylene and polypropylene as main components has been proposed.

For example, Japanese Patent No. 3235669 discloses a battery separator excellent in thermal shrinkage resistance and shutdown characteristics. This separator includes: at least one first layer formed of a polymer selected from low-density polyethylene, ethylene-butene copolymer, and ethylene-hexene copolymer; and at least one second layer formed of a polymer selected from high-density polyethylene, ultra-high molecular weight polyethylene, and polypropylene.

For example, Japanese Patent No. 3422496 discloses a battery separator excellent in shutdown characteristics. This separator includes: at least one first layer formed of a polymer selected from ethylene-butene copolymer, ethylene-hexene copolymer, ethylene-methacrylate copolymer, and polyethylene; and at least one second layer formed of a polymer selected from polyethylene and polypropylene.

Japanese Patent No. 2883726 discloses a battery separator excellent in shutdown and meltdown characteristics. The battery separator is produced through a method in which polypropylene having a melting point of 150° C. or higher and polyethylene having a melting point in the range of 100° C. to 140° C. are simultaneously extruded to obtain a laminated film, the laminated film is uniaxially stretched in a temperature range of −20° C. to [melting point (Tm0) of polyethylene-30] ° C., and the film is stretched in the same direction in a temperature range of [Tm 0-30] ° C. to [Tm 0-2] ° C. to obtain a porous film.

Japanese Patent Application Publication No. 11-329390 discloses a battery separator excellent in shutdown characteristics and strength. This battery separator includes two polypropylene microporous strengthened layers and a filler-containing polyethylene barrier layer interposed therebetween, in which the polyethylene barrier layer is composed of a microporous membrane manufactured by a particle stretching method.

A battery is manufactured by bonding such a separator to an electrode, and the bonding is performed by a lamination process in which the electrode and the separator are stacked, and then heat and/or pressure applied to the laminate. The higher the heat and/or pressure applied in the lamination process, the higher the adhesion of the separator to the electrode. Recently, the process speed is increased to improve productivity, resulting in a decrease in the time for which heat is applied to the separator. For this reason, to obtain a satisfactory adhesive strength, the pressure is increased. This leads to a problem in that the separator is deformed by the high pressure. In particular, when a separator substrate that is vulnerable to pressure is used, a large thickness reduction occurs, and the pore damage is significant. Therefore, not only the performance of the battery but also the breakdown voltage of the separator is reduced, resulting in Hi-pot failure and low voltage failure. Therefore, it is necessary to develop a porous polymer film substrate for a separator that exhibits little deformation even under high-pressure lamination conditions.

SUMMARY OF THE INVENTION

An objective of the present disclosure is to provide a separator substrate having a low thickness strain and a high dielectric breakdown voltage, and a separator including the same. Another objective of the present disclosure is to provide a method for selecting a separator substrate having excellent breakdown voltage characteristics. It will be readily apparent that the objectives and advantages of the present disclosure can be achieved by means or methods and combinations thereof recited in the claims.

According to embodiments, to accomplish the objective, there is provided a separator substrate for an electrochemical device. The separator substrate is a sheet-shaped porous membrane having of pores and the separator substrate contains a polymer material. The polymer material includes a polyolefin-containing resin. The separator substrate exhibits a difference of 100 psi or less between the maximum pressure and the minimum pressure in a wet curve measurement.

The separator substrate may include fibrils, including microfibrils, having a diameter of 50 nm to 250 nm, and space present between the fibrils, or microfibrils, forms pores indicating porosity. The separator substrate may have a porosity of 30 vol % to 65 vol %.

The separator substrate may have a thickness in a range of 5 µm to 50 µm.

The polymer material may contain an amount of 90 wt % or more of a polyolefin-containing resin relative to 100 wt % of the polymer material.

The polyolefin-containing resin may include at least one selected from the group consisting of polyethylene, polypropylene, polybutylene, and polypentene.

The polymer material may have a poly dispersity index (PDI) value ranging from 1.0 to 12.0.

The polymer material may contain an amount of 90 wt % or more of polyethylene having a PDI value of 1.0 to 12.0 relative to 100 wt % of the polymer material.

The polymer material may have a PDI value ranging from 5.0 to 10.0.

The polymer material may contain polyethylene having a PDI value in a range of 5.0 to 10.0 in an amount of 90% or more by weight with respect to 100% by weight of the polymer material.

The polymer material may have a weight average molecular weight (Mw) of 200,000 g/mol to 1,800,000 g/mol.

According to another embodiment of the present disclosure, there is provided a method for forming a battery cell separator, the method including: a first step of preparing a separator substrate; a second step of performing a wet curve measurement of the separator substrate and obtaining a minimum pressure value and maximum pressure value according to the wet curve measurement results of the separator substrate; a third step of calculating a difference between the maximum pressure value and the minimum pressure value obtained from the second step; a fourth step of comparing the calculated value with a preset reference value of 100 psi or less; and a fifth step of using the prepared separator substrate in the battery cell separator when the calculated difference value is 100 psi or less.

Before performing the second step, performing a dry curve measurement on the separator substrate, and when the separator substrate has a pressure in a range of 30 psi to 500 psi obtained from the dry curve measurement, the separator substrate is selected to perform the third step.

The separator substrate may be prepared through a wet manufacturing method.

The separator substrate may be prepared through a dry manufacturing method.

According to another embodiment of the present disclosure, there is provided a separator for an electrochemical device, the separator including: the separator substrate described above and a heat-resistant layer on either one or both of surfaces of the separator substrate, in which the heat-resistant layer contains a binder resin and inorganic particles.

The binder resin may contain a particulate binder polymer.

According to another embodiment of the present disclosure, there is provided an electrochemical device including a negative electrode, a positive electrode, and the separator described above, and the separator is present between the negative electrode and the positive electrode.

The separator substrate according to the present disclosure has a small pore size and a uniform pore distribution. When the substrate is used in a separator, in the case where the separator and the electrode are laminated and put into a lamination process together, the thickness change is small, and the dielectric breakdown voltage is high.

BRIEF DESCRIPTION OF THE DRAWINGS

The accompanying drawings illustrate preferred embodiments of the present disclosure and illustrate the principles of the present disclosure in conjunction with a detailed description given below, but the scope of the present disclosure is not limited thereto. The shape, size, scale, or ratio of the elements illustrated in the drawings and described herein may be exaggerated to emphasize the clarity of each element.

FIG. 1 is a SEM image illustrating the separator substrate according to an embodiment of the present disclosure.

FIG. 2 is a schematic views of a sample of a dry curve and a sample of a wet curve.

FIG. 3 is a schematic view of the separator substrate formed by laminating a three-layer film according to an embodiment of the present disclosure.

DESCRIPTION OF THE PREFERRED EMBODIMENTS

Hereinafter, the present disclosure will be described. Prior to giving the following detailed description of the present disclosure, it should be noted that the terms and words used in the specification and the claims should not be construed as being limited to ordinary meanings or dictionary definitions but should be construed in a sense and concept consistent with the technical idea of the present disclosure, on the basis that the inventor can properly define the concept of a term to describe its invention in the best way possible. The exemplary embodiments described herein are presented for illustrative purposes and do not exhaustively represent the technical idea of the present invention. Accordingly, it should be appreciated that there will be various equivalents and modifications that can replace the exemplary embodiments and the configurations at the time at which the present application is filed.

It will be further understood that the terms "comprise", "include", or "has", when used in this specification, specify the presence of an element, but do not preclude the presence or addition of one or more other elements unless the context clearly indicates otherwise.

Words of degree, such as "about", "substantially", and the like are used herein in the sense of "at, or nearly at, when given the manufacturing, design, and material tolerances inherent in the stated circumstances," and are used to prevent the unscrupulous infringer from unfairly taking advantage of the invention disclosure where exact or absolute figures are stated as an aid to understanding the invention.

Throughout the description of the present specification, the expression "A and/or B" means "A, B, or both of A and B".

The present disclosure relates to a separator substrate for an electrochemical device. In the present invention, an electrochemical device is a device that converts chemical energy into electrical energy via an electrochemical reaction, and primary batteries and secondary batteries fall within the concept of such an electrochemical device. The secondary battery can undergo charging and discharging, and it is a concept encompassing lithium ion batteries, nickel-cadmium batteries, nickel-hydrogen batteries, and the like.

Separator

In the present specification, the separator serves as a porous ion-conducting barrier that allows ions to pass while blocking electrical contact between the cathode and the anode in the electrochemical device. It is preferable that a plurality of pores is formed in the separator, and the pores are interconnected to each other, so that gas or liquid can pass through from one side to the other side of the separator.

A separator according to an embodiment of the present disclosure includes a porous separator substrate having a plurality of pores and the porous separator substrate contains a polymer material, and the separator substrate may be a polymer film. The separator may further include an additional layer on at least one surface of the separator if necessary, in terms of material or function. In one embodiment of the present disclosure, the separator may include the separator substrate and a heat-resistant layer. For example, the heat-resistant layer may be present on at least one surface of the separator substrate. The heat-resistant layer may contain inorganic particles and/or a binder resin.

In one embodiment of the present disclosure, the inorganic particles in the heat-resistant layer may be provided in a layered structure in which the inorganic particles are bound by a binder resin, and the separator substrate has a porous structure due to the space (interstitial volume) formed between the inorganic particles. This porous structure has the effect of improving the electrolyte retention ability of the separator. In one embodiment of the present disclosure, when the separator includes a heat-resistant layer, when the total volume of the separator indicated as 100%, the heat-resistant layer may account for 3 vol % to 40 vol %. Simultaneously or independently, when the whole thickness of the separator is indicated as 100%, the heat-resistant layer may account for 5% to 50% of the thickness of the separator.

Separator Substrate

FIG. 1 is a SEM image illustrating the separator substrate according to an embodiment of the present disclosure.

In one embodiment of the present disclosure, the separator substrate is a sheet-shaped porous membrane containing a polymer material and having a plurality of pores. For example, the separator substrate may be a porous polymer film. The pores include open pores, and the open pores are structured to be connected to each other so that gas or liquid can pass through the separator from one side to the other. In one embodiment of the present disclosure, the separator substrate preferably has an air permeability of 2000 sec/100 cc or less and a porosity of 30 vol % to 65 volt, and more specifically 35 vol % to 55 vol %, in terms of the output and cycle characteristics of the battery. In the present disclosure, the separator substrate preferably has an average pore diameter in the range of 10 nm to 100 nm, specifically 15 nm to 70 nm, more specifically 20 nm to 40 nm, and still more specifically 20 nm to 30 nm or 30 nm to 40 nm. When the average pore diameter is smaller than 10 nm, a shutdown phenomena occurs at low temperatures so that the separator cannot provide the required functions. When the average pore diameter exceeds 100 nm, the dielectric withstanding voltage of the separator may be deteriorated.

In the present disclosure, the separator substrate may be cleaved between the polyolefin lamellae due to the stretching performed during the preparation thereof as will be described later, so that the polymer is refined, and a number of fibrils are formed. The fibrils constitute a very fine network structure in which the fibrils are irregularly and three-dimensionally connected, and the gaps between these fibrils become pores.

In the present disclosure, the fibrils may have a diameter in the range of 50 nm to 250 nm, specifically 100 nm to 200 nm, more specifically 120 nm to 180 nm, and yet more specifically 140 nm to 160 nm. When the diameter of the fibrils is larger than 250 nm, the size of the pores formed around the fibrils increases, so that it may be difficult to secure sufficient insulation. When the diameter of the fibrils is smaller than 50 nm, there may be a problem in that the fibrils are easily deformed, and the pores of the separator substrate may be blocked during the lamination process when the battery is manufactured.

The average diameter of the fibrils may be in the range of 100 nm to 200 nm and specifically in the range of 140 nm to 160 nm. When the average diameter of the fibrils is larger than 200 nm, the overall resistance of the separator substrate may be increased. When the average diameter of the fibrils is smaller than 100 nm, the fibrils may be easily deformed and the pores of the separator substrate may be easily blocked during the lamination process when the battery is manufactured.

In one embodiment of the present disclosure, the diameter of the fibrils may be measured from a scanning electron microscope (SEM) image of the separator substrate, but the measurement method is not particularly limited thereto.

In the present disclosure, the air permeability refers to the time (in seconds) it takes for 100 ml of air to pass through a separator substrate or separator having a size of a square inch at a constant air pressure of 4.8-inch $H_2O$. The air permeability can be measured using, for example, EG01-55-1MR equipment manufactured by Asahi Seiko.

The porosity refers to the ratio of the volume occupied by pores to the total volume, is expressed in units of vol %. In the present disclosure, the measurement method of the porosity is not particularly limited. In one embodiment of the present disclosure. For example, Brunauer Emmett-Teller (BET) measurement using nitrogen gas or mercury permeation (Hg porosimeter) may be used for the measurement of the porosity. Alternatively, in one embodiment of the present disclosure, on the basis of the density (apparent density) of an obtained electrode (electrode active material layer), the content ratio of the materials included in the electrode (electrode active material layer), and the density of each component of the electrode active material layer, the net density of the electrode active material layer is calculated. In addition, the porosity of the electrode active material layer can be calculated from the difference between the apparent density and the net density.

In one embodiment of the present disclosure, the separator substrate has a small and uniform pore size. When the separator substrate is used in a separator for an electrochemical device, the separator may exhibit excellent shape stability, and the electrochemical device may exhibit excellent breakdown voltage characteristics. The distribution of the pores in the separator substrate can be confirmed through an air permeation curve test of a sample. In the separator substrate according to the present disclosure, it is preferable that the difference between the maximum pressure and the minimum pressure is 100 psi or less in a "wet curve" measurement.

When the pressure difference exceeds 100 psi, it means that the size difference between the largest pore and the smallest pore among the pores formed in the separator substrate is large. That is, the pore size variation is large and the sizes are not even or uniform, so that the insulation of the separator after the compression may be reduced. FIG. 2 is a schematic views of a sample of a dry curve and a sample of a wet curve. As shown in FIG. 2, in the present disclosure, the maximum pressure of the wet curve means the pressure at the point where a wet curve of a wet sample meets a dry curve of a dry sample. In addition, the minimum pressure of the wet curve means the pressure at the point where a bubble point appears. For bubble point measurement, the information given below may be referenced.

The wet curve test is performed such that a porous structure is wet with a solution (Galwick solution) with a low surface tension of 15.9 dynes/cm, the structure is pressurized with a gas, and the pressure required to push out the solution filling the pores of the structure is measured. In one embodiment of the present disclosure, the wet curve is obtained by preparing a dry separator substrate and a measurement liquid, filling the pores of the separator substrate with the measurement liquid, pushing out the measurement liquid from the pores, and obtaining a relationship between the air pressure and the air flow rate using a porosimeter when the measurement liquid is being pushed out of the pores. The term "dry state" refers a state in which a separator substrate has been manufactured by a conventional separator substrate manufacturing method. That is, it refers to a state in which the separator substrate has never been in contact with liquids such as water or organic solvents. In one embodiment of the present disclosure, the wet curve of the wet sample may be obtained by the method described below. A wet sample in which the pores thereof are filled with a measurement liquid exhibits the same characteristics as a liquid-filled capillary. When a wet sample is mounted on a porosimeter and the air pressure is gradually increased, the air pressure becomes higher than the surface tension of the measurement liquid in the pores in order from the large pores to the small pores, the measurement liquid is extruded from the pores, and the air flow rate gradually increases accordingly. Finally, the sample becomes dry. Therefore, the minimum and maximum values of the pressure are obtained by measuring the pressure when the liquid is extruded from the pores, and the pore diameters are also calculated. Here, assuming that the shape of the pores is substantially cylindrical, the condition under which air with an air pressure P can enter the pore with a diameter of D is expressed as the Washburn equation represented by Equation 1 below in which the surface tension of the measurement liquid is γ, and the contact angle of the solution is e.

$$PD = 4\gamma \cos\theta \quad \text{(Equation 1)}$$

In particular, a measurement point (which is a point corresponding to the diameter of the largest pore) at which bubble generation is first detected is called a bubble point. As a standard measurement method for a bubble point, for example, there is a method described in ASTM F316-86.

When the difference between the maximum pressure and the minimum pressure satisfies the range of 100 psi or less in the "wet curve" measurement, the separator substrate pores are small and uniform in size. The separator substrate having these characteristics has high shape stability and exhibits a high dielectric breakdown voltage.

In one embodiment of the present disclosure, the separator substrate preferably exhibits a pressure range of 30 psi to 500 psi, specifically the range of 140 psi to 400 psi, in a "dry curve" measurement. The dry curve measurement is performed such that a gas is supplied to apply a pressure to a porous structure, and the pressure required to push out the existing gas filling the pores of the porous structure is measured. In one embodiment of the present disclosure, the dry curve is obtained by preparing a dry separator substrate, pushing out gas from the pores, and identifying a relationship between the air pressure and the air flow rate using a porosimeter when the gas is pushed out from the pores.

In one embodiment of the present disclosure, the separator substrate may have a thickness in the range of 3 μm to 50 μm, specifically in the range of 5 μm to 40 μm, and more specifically in the range of 5 μm to 30 μm, in terms of achieving thinner film and higher energy density for an electrochemical device. When the thickness of the separator substrate is smaller than 3 μm, the function of the conductive barrier may not be sufficient. When the thickness of the separator substrate exceeds 50 μm (that is, when the thickness is excessively large), the resistance of the separator may be excessively high, and the content of the active material may be reduced, resulting in a reduction in the capacity of the electrochemical device.

In one embodiment of the present disclosure, the polymer material is preferably a thermoplastic resin having a melting point of 200° C. or lower in terms of imparting a shutdown function. Examples of the polymer material include one or more polyolefin-containing resins. The shutdown function refers to a function of preventing thermal runaway of a battery by blocking the movement of ions between the positive electrode and the negative electrode when the battery temperature rises. The shutdown performance of the separator is associated with the melting point, molecular weight, and crystallinity-by-elongation of the polymer material used. The melting point and the crystallinity may be determined in a thermal fixing process described below when the separator substrate is manufactured.

In the present disclosure, the polyolefin-containing resin preferably may be present as at least 90 wt % or more or 95 wt % or more of the polymer material when the amount of the polymer material is expressed as 100 wt %.

Examples of the polyolefin-containing resin may include one or a mixture of two or more selected from the group consisting of polyethylene, polypropylene, polybutene, and polypentene. Specifically, the polyolefin-containing resin may be polyethylene and/or polypropylene.

In a specific embodiment of the present disclosure, the polymer material preferably has a poly dispersity index (PDI) in the range of 1.0 to 12.0, preferably 3.8 to 12.0, more preferably 5.0 to 10.0. In one embodiment, when two or more types of polymer materials are mixed, the mixed polymer material may satisfy the above PDI range. In a more preferred embodiment, with respect to 100% of the polymer material satisfying the above PDI range, any one type of polymer resin as a single component may be present for more than 50 wt %, 70 wt % or more, or 90 wt % or more. For example, the polymer material may consist of only a single component. The single component means that the polymer material has the same chemical structure and the PDI satisfies the range of 1.0 to 12.0.

In a specific embodiment of the present disclosure, with respect to 100 wt % of the polymer material, polyethylene having a PDI range of 1.0 to 12.0 is contained in an amount of 90 wt % or more. Alternatively, the polymer material consists of only the polyethylene.

As described above, when satisfying the above PDI range, the content range of the polymer resin, or both of the ranges, it may be helpful to improve the uniformity in the size and distribution of pores in the polymer substrate. Here, the PDI value greater than 12.0 is not preferable because the PDI range may deteriorate the uniformity of pores and mechanical strength of the substrate and may negatively affect the dielectric withstanding voltage.

The PDI may be obtained from a ratio of weight average molecular weight (Mw) to number average molecular weight (Mn).

In the present disclosure, the weight average molecular weight (Mw) and the number average molecular weight (Mn) can be measured by gel permeation chromatography (GPC, PL GPC220, Agilent Technologies), and the measurement conditions are as follows:
  Column: PL Olexis (Polymer Laboratories)
  Solvent: trichlorobenzene (TCB)
  Flow rate: 1.0 ml/min
  Sample concentration: 1.0 mg/ml Injection volume: 200 µl Column temperature: 160° C.

Detector: Agilent High Temperature RI detector

Standard: Polystyrene (calibrated with a cubic function)

In another embodiment, the polymer material may have a melting index (MI) in the range of 0.02 g/10 min to 1.0 g/10 min. The MI is based on a condition in which a load of 21.6 kg is applied at 190° C.

In one embodiment of the present disclosure, the polymer material may have a weight average molecular weight (Mw) in the range of 200,000 g/mol to 1,800,000 g/mol, and preferably in the range of 300,000 g/mol to 1,500,000 g/mol, more preferably 500,000 g/mol to 1,000,000 g/mol. A weight average molecular weight smaller than 200,000 g/mol may deteriorate mechanical properties and heat resistance. A weight average molecular weight larger than 1,800,000 g/mol may deteriorate the extrusion performance due to the excessively high viscosity of the polymer material and may impede elongation due to excessively high elasticity.

In one embodiment of the present disclosure, the polymer material may have a number average molecular weight (Mn) in the range of 30,000 g/mol to 300,000 g/mol. A number average molecular weight smaller than 30,000 g/mol may deteriorate mechanical properties and heat resistance. A number average molecular weight larger than 300,000 g/mol may deteriorate the extrusion performance due to the excessively high viscosity of the polymer material and may impede elongation due to excessively high elasticity.

In a specific embodiment of the present disclosure, the separator substrate may contain polyethylene, and may additionally contain polypropylene, if necessary. In this case, polyethylene may account for 95 wt % or more with respect to 100 wt % of the polymer material, and the remainder of the polymer material may be polypropylene. The separator substrate may contain polypropylene. However, the content of polypropylene in the separator substrate is 5 wt % or less. For example, the content of polypropylene is preferably controlled to less than wt %. The higher the polypropylene content, the higher the thermal resistance of the separator. However, when the content of polypropylene exceeds the above range of 5 wt %, when the separator substrate is prepared by the wet method to be described later, since the raw material is chemically unstable, pores cannot be well formed. That is, it is disadvantageous in terms of the development of porous properties, the content of polypropylene is preferably controlled to fall within the range of less than 5 wt % described above.

In addition, when the polypropylene content is high, a dry method is advantageous over a wet method to obtain a separator substrate with well-developed pores. However, when using the dry method, it is relatively difficult to control the separator substrate to be thin compared to the case of using the wet method.

In one specific embodiment of the present disclosure, the separator substrate may further contain at least one additional polymer resin such as polyethylene terephthalate, polybutylene terephthalate, polyacetal, polyamide, polycarbonate, polyimide, polyetheretherketone, polyethersulfone, polyphenylene oxide, polyphenylene sulfide, and polyethylene naphthalene.

In a specific embodiment of the present disclosure, the separator substrate may be a porous polymer film prepared in the manner described below and may be a single-layer film or a multi-layer film formed by laminating two or more sheets.

More specifically, the separator substrate of the present disclosure may be a multilayer film in which two or more, or three or more layers are stacked.

FIG. 3 is a schematic view of the separator substrate formed by laminating a three-layer film according to an embodiment of the present disclosure. As shown in FIG. 3, in the film, the sizes of the pores formed in a region near the surface (10, 30) of the separator substrate (100) may be smaller than the sizes of the pores formed in an intermediate region (20) (a region between the surface regions) of the film. For example, the sizes of the pores formed in a region near the surface of the separator substrate may range from 20 nm to 40 nm, and the sizes of the pores formed in the intermediate region of the film may range from 30 nm to 50 nm. When this condition is satisfied, the likelihood that the binder resin present in the optional heat-resistant layer enters the pores of the separator substrate is further reduced, and the shutdown function is imparted to improve the safety of the electrochemical device.

Additionally or alternatively, by controlling the melting point of the intermediate region of the film to be higher than the melting point of the film present near the surface of the separator substrate, it is possible to further improve the safety of the separator substrate. That is, when a problem of a sudden increase in temperature occurs during operation of the electrochemical device, the surface portion of the separator substrate melts by heat and the pores are blocked. That is, the shutdown function is provided. In this case, the melting point of the film present near the surface of the separator substrate may be in the range of 125° C. to 130° C., and the melting point of the intermediate region of the film may be in the range of 135° C. to 140° C.

Additionally or alternatively, by adjusting the weight average molecular weight of the intermediate region of the film to be larger than the weight average molecular weight of the film present near the surface of the separator substrate, it is possible to improve the compression resistance of the separator substrate. In this case, the weight average molecular weight of the film present near the surface of the separator substrate may be in the range of 200,000 g/mol to 400,000 g/mol, and the weight average molecular weight of the intermediate region of the film may be in the range of 300,000 g/mol to 800,000 g/mol.

As described above, for the separator substrate being a multilayer film composed of two or more layers, the case where the pore size of the intermediate region of the film is controlled to be larger than the pore size of the surface region, and the cases where the melting point and the weight average molecular weight of the intermediate region of the film are controller to be larger than those of the region near the surface of the separator substrate have only described. However, the separator substrate of the present disclosure may not be limited thereto. Separator substrates that satisfy the conditions opposite to the above conditions depending on the use of electrochemical devices may fall within the scope of the present disclosure.

In the present disclosure, the separator satisfying the above values improves the withstand voltage characteristic of the battery, resulting in increase in the breakdown voltage and decrease in the short circuit occurrence rate (Hi-Pot defect rate) even under high voltage conditions.

In an embodiment of the present disclosure, the breakdown voltage is the highest voltage that an insulator can withstand. When a voltage is applied to an insulator, the applied voltage is higher than the breakdown voltage, the insulator is destroyed, thereby exhibiting no insulation performance.

In one embodiment of the present disclosure, the withstand voltage characteristic can be confirmed by measuring the breakdown voltage of the separator. This is performed by placing a separator that is an insulator between two conductors, applying a voltage across the separator, and measuring the voltage at which dielectric breakdown occurs.

To measure the breakdown voltage, for example, an AC/DC/IR Hi-Pot tester may be used. For example, after hot-press bonding a stainless steel mesh and the separator substrate under conditions of 90° C., 4 MPa, and 1 sec, the DC current is set to 0.5 mA, and the voltage increase is set to 100 V/s (voltage 3 kV, ramp up time 3 seconds). After the test starts, when the voltage rises and a short circuit occurs, the measurement is completed, and the voltage at this time is defined as the breakdown voltage.

In addition, in one embodiment of the present disclosure, the evaluation of the short circuit occurrence rate (Hi-Pot defect rate) is performed such that the lower 1% of specimens showing a low breakdown voltage through Weibull analysis among the total number of specimens tested is checked.

The dielectric breakdown voltage of the separator substrate according to the present disclosure may be 400 V or higher. When the range of 400 V or higher is satisfied, it is the required sufficient to obtain withstanding voltage characteristic of the separator substrate.

Method of Manufacturing Separator Substrate

In one embodiment of the present disclosure, the separator substrate may be prepared by a polymer film manufacturing method, including a wet manufacturing method and a dry manufacturing method. In a dry manufacturing method, as compared to a wet manufacturing method described below, the dry manufacturing method produces a separator through the steps of forming an extruded sheet, stretching the extruded sheet, and heat-setting the extruded sheet without using a pore former or an extraction solvent.

Among the methods, a wet manufacturing method is preferably used. For example, the wet manufacturing method includes the steps of (S1) preparing a mixture, (S2) extruding the mixture and forming an extruded sheet, (S3) stretching the extruded sheet, (S4) removing a pore former, and (S5) performing thermal setting on the extruded sheet.

In step (S1), a type of polymer resin is appropriately selected according to the final physical properties of the separator, and the polymer resin thus selected is mixed with a pore former. As for the polymer resin, reference may be made to the above detailed description of the polymer resin of the separator substrate. For example, the polymer resin may be a polyolefin-containing polymer resin. Examples of the polyolefin-containing polymer resin include any one or a combination of two more selected from polyethylenes, such as high-density polyethylene, linear low-density polyethylene, low-density polyethylene, and ultra-high molecular weight polyethylene, polypropylene, polybutylene, and polypentene.

The pore former is a substance that is first dispersed in the polymer and exhibits heterogeneity of the substrate prepared through extrusion, stretching, etc. The pore former is subsequently removed from the substrate. Accordingly, in the substrate, the portions occupied by the pore former remain in the form of pores. The pore former may exist in liquid or solid phase during the extrusion process. The pore former may be an aliphatic hydrocarbon-containing solvent such as liquid paraffin, paraffin oil, mineral oil, or paraffin wax. Alternatively, the pore former may be a vegetable oil such as soybean oil, sunflower oil, rapeseed oil, palm oil, coconut oil, corn oil, grapeseed oil, cottonseed oil, or the like.

Further alternatively, the pore former may be a plasticizer such as a dialkyl phthalate. The plasticizer is di-2-ethylhexyl phthalate (DOP), di-butyl-phthalate (DBP), diisononyl phthalate (DINP), di-isodecyl phthalate (DIDP), butyl benzyl phthalate (BBP), or the like. Among these, liquid paraffin (LP, also referred to as "liquid phase paraffin") is particularly preferred.

In addition, an amount of the pore former used to prepare the separator may be appropriately adjusted to achieve a desired level of porosity. In terms of improving air permeability, it is preferable that the amount of the pore former is high. However, when the pore former is present in an excessive amount, it may negatively affect the strength of the finally produced substrate. Therefore, the amount of the pore former may be in the range of 1 wt % to 80 wt % with respect to 100 wt % (total amount) of the polymer resin and the pore former. If necessary, the amount of the pore former may be adjusted to be in the range of 70 wt % or less, in the range of 60 wt % or less, in the range of 50 wt % or less, in the range of 1 wt % or more, in the range of 20 wt % or more, or in the range of 40 wt % or more, all of which must fall within the range of 1 wt % to 80 wt %. In a specific embodiment of the present disclosure, in terms of implementing an appropriate porosity of the separator substrate, for example, in order to achieve a porosity of about 45% or less, the pore former is present in an amount of 1 wt % to 60 wt % relative to the total amount of the polymer resin and the pore former.

Next, the mixture prepared in the above step is extruded through an extruder, thereby producing an extruded sheet. The extruder is not particularly limited, and may be an extruder commonly used in the art. For example, the extruder may be, but may not be limited to, an extruder having a T-die or a tubular die attached thereto. The extrusion process can be carried out at a typical extrusion temperature. The extrusion process is preferably carried out at a temperature that is 10° C. to 100° C. higher than the melting point of the polymer resin used. When the extrusion process is performed at a temperature excessively higher than the above range, the polymer resin may undergo thermal degradation. In this case, it may be difficult to form a film, and the physical properties of the prepared substrate may be deteriorated. An extruded sheet can be obtained through this extrusion process.

Next, the extruded sheet undergoes a stretching process. This stretching process is carried out with a stretching machine commonly used in the art. The stretching machine may be a sequential biaxial stretching machine but is not particularly limited thereto. By stretching the extruded sheet in this way, it is possible to increase the mechanical strength of the separator substrate. The stretching process is carried out in the longitudinal direction (MD), which is also called machine direction (or lengthwise direction), and/or in the transverse direction (TD). Due to the stretching, cleavage may occur between the lamellae of the polyolefin, resulting in generation of a number of fibrils, which are connected irregularly in three dimensions to form a very fine network structure. Moreover, due to the stretching (extending) process in all or one of these directions, the tensile strength in the stretching direction may be increased. If necessary, when manufacturing the separator of the present disclosure, the stretching may be performed in one direction (uniaxial stretching) of the machine direction (MD) and the transverse direction (TD) or performed sequentially or simultaneously in both directions (biaxial stretching). In one embodiment of the present disclosure, the temperature of the stretching film may be controlled to be in the range of 100° C. to 130° C.

and preferably in the range of 110° C. to 125° C. For example, the temperature of the film during the stretching may be controlled in the range of 115° C. to 121° C. When the stretching process is performed in the above temperature range, a film having small and uniformly distributed pores can be obtained.

In one embodiment of the present disclosure, during the stretching process, the draw ratio in the MD/TD direction is each greater than 3 times and less than 12 times, specifically greater than 4 times and less than 10, more specifically greater than 5 times and less than 7 times, and even more specifically about 6 to 7 times. The total draw ratio is preferably about 20 to 80 times.

When the draw ratio is less than the above numerical range, the orientation in one direction may not be sufficient and concurrently the balance of physical properties between the longitudinal and transverse directions may be broken, so that the tensile strength and the puncture strength may be lowered. In addition, if the total draw ratio is less than 20 times, non-stretching may occur and pores may not be formed, and if the total draw ratio exceeds 80, there may be disadvantages in that a rupture occurs during stretching and the shrinkage of the finished film may be increased.

In one embodiment of the present disclosure, the amount of stretching in the MD and the TD be roughly equivalent. If the stretching is not roughly equivalent in both the MD and the TD, it may be undesirable from a standpoint of unevenness in the film.

Next, the pore former is removed from the extruded sheet obtained above. The pore former is removed by extraction with a solvent and drying. Through this removal, the space occupied by the pore former becomes pores. As the solvent usable for extraction of the pore former, any solvent capable of extracting the pore former may be used. Preferably, methyl ethyl ketone, methylene chloride, and hexane that have high extraction efficiency and can quickly dry are suitable. Preferably, the solvent may be methylene chloride and specifically methylene dichloride (MC). As the extraction method, all common solvent extraction methods such as an immersion method, a solvent spray method, and an ultrasonic method may be used individually or in combination.

After the extraction of the pore former, a step of thermally setting the substrate is performed, thereby finally obtaining a separator having desired physical properties, porosity, and air permeability. The thermal setting step may be performed using a heating device, such as an oven, capable of applying an appropriate temperature required for thermal setting. In particular, the previously dried film is finally subjected to thermal setting to reduce the shrinkage of the finally prepared film by removing the residual stress. The thermal setting is performed to remove residual stress by fixing the film that tends to contract through heating. A higher thermal setting temperature is advantageous in lowering the shrinkage rate. However, when the temperature is excessively high, the film may partially melt, thereby clogging the formed pores and lowering the transmittance. The thermal setting temperature is preferably selected in a temperature range in which approximately 10 wt % to 30 wt % of the crystalline portion of the film melts. When the thermal setting temperature is selected to be lower than the temperature at which about 10 wt % of the crystalline portion of the film melts, the reorientation of polyethylene molecules in the film may be insufficient, and thus the effect of removing the residual stress of the film may not be obtained. When the temperature at which about 30 wt % of the crystalline portion melts is selected, pore clogging may occur due to the partial melting and the transmittance may be lowered. More specifically, when the thermal setting temperature is 130° C. or lower, preferably between 120° C. and 130° C., the pore sizes fall within the range of 10 nm to 100 nm which are suitable sizes, so that the shutdown performance and compression resistance of the separator can be improved. The thermal setting temperature being above 130° C. may negatively affect the shutdown performance. In this case, to compensate for this deterioration in shutdown performance, a pore former (diluent) having a relatively high kinematic viscosity of 50 cSt may be used, or an ultra-high molecular weight polymer resin having a weight average molecular weight in the range of about 1,000,000 g/mol to 2,000,000 g/mol, and specifically a weight average molecular weight of about 1,500,000 g/mol may be used.

In one embodiment of the present disclosure, after the separator substrate is prepared, wet curve evaluation is performed on the separator substrate, the minimum and maximum pressure values are measured according to the evaluation results, the difference between the minimum pressure and the maximum pressure is calculated, and the calculated difference value is compared with a reference value. In this way, the separator substrate is selected. As described above, the result of the wet curve evaluation preferably shows that the difference between the minimum pressure and the maximum pressure is 100 psi or less.

In one embodiment of the present disclosure, the dry curve measurement is performed first before a wet curve measurement. At this time, separator substrates exhibiting a pressure in the range of 30 psi to 500 psi are primarily selected on the basis of the result of the dry curve measurement, and then a wet curve measurement is performed on the primarily selected separator substrates.

In one embodiment of the present disclosure, the separator substrate may be a single layer structure. Alternatively, the separator substrate may be a laminate in which two or more films are stacked. At this time, at least one of the films included in the laminate may be formed by the above-described method.

Heat-Resistant Layer

In one embodiment of the present disclosure, the separator may include a heat-resistant layer on at least one surface of the separator substrate. The heat-resistant layer includes an adhesive binder resin and inorganic particles, has a plurality of micropores inside thereof, and is structured such that these micropores are connected to each other. The heat-resistant layer has a structural characteristic in that it is a porous layer through which gas or liquid can pass from one side to the opposite side. In one embodiment of the present disclosure, the binder resin to the inorganic particles in the heat-resistant layer may be present in a weight ratio of 1:99 to 30:70, preferably 5:95, more preferably 10:90, more preferably 15:85, and more preferably 20:80. The weight ratio may be appropriately adjusted within the above range. For example, when the sum of the amount of the binder resin and the amount of the inorganic particles is 100 wt %, the amount of the binder resin may be in the range of 1 wt % or more, in the range of 5 wt % or more, or in the range of 10 wt % or more, and the amount of the inorganic particles may be in the range of 80 wt % or more, in the range of 85 wt % or more, in the range of 90 wt % or more, or in the range of 95 wt % or more. In the present disclosure, the heat-resistant layer preferably has a porous structure in terms of ion permeability.

In the heat-resistant layer, the inorganic particles are bonded to each other by the binder resin, and pores may be formed due to an interstitial volume present between the inorganic particles. The interstitial volume is a space defined by inorganic particles substantially facing each other in a closed packed or densely packed structure of the inorganic particles.

In one embodiment of the present disclosure, the porosity of the heat-resistant layer is in the range of 30 vol % to 70 volt, and the porosity may be 35 vol % or more, or 40 vol % or more within the range of 30 vol % to 70 vol %. The porosity may be 65 vol % or less, or may be 60 vol % or less, simultaneously or independently. For example, the porosity may be in the range of 40 vol % to 60 volt. When the porosity is 70 vol % or less, it is possible to secure mechanical properties that can withstand the pressing process performed to bond the separator to the electrode, and the surface opening ratio is not increased to an excessively high level. Therefore, the porosity that is 70 vol % or less is suitable for obtaining good adhesion. When the porosity is 30 vol % or more, it is advantageous in terms of ion permeability.

In the present disclosure, the porosity may be measured using an adsorbed gas such as nitrogen and BELSORP (BET equipment) manufactured by BEL JAPAN or may be measured by a method such as mercury intrusion porosimetry. Alternatively, in one embodiment of the present disclosure, on the basis of the density (apparent density) of an obtained electrode (electrode active material layer), the ratio of the materials included in the electrode (electrode active material layer), and the density of each component of the electrode active material layer, the net density of the electrode active material layer is calculated. In addition, the porosity of the electrode active material layer can be calculated from the difference between the apparent density and the net density.

The thickness of the heat-resistant layer may be in the range of 1 μm to 6 μm on one side of the separator substrate. Within the above range, the thickness of the heat-resistant layer may be 2 μm or more, or 3 μm or more as necessary. Within the above numerical range, the adhesion to the electrode is excellent, and thus the cell strength of the battery is increased. When the thickness is 6 μm or less, it is advantageous in terms of cycle characteristics and resistance characteristics of the battery.

In the present disclosure, non-limiting examples of the binder resin usable for the heat-resistant layer include any one polymer resin or a mixture of two or more polymer resins selected from the group consisting of polyvinylidene fluoride-co-hexafluoropropylene, polyvinylidene fluoride-co-trichloroethylene, polymethylmethacrylate, polybutylacrylate, polyacrylonitrile, polyvinylpyrrolidone, polyvinylacetate, polyethylene-co-vinyl acetate, polyethylene oxide, polyarylate, cyanoethylpullulan, cyanoethylpolyvinylalcohol, cyanoethylcellulose, cyanoethylsucrose, pullulan, and carboxyl methyl cellulose. However, the present disclosure is not particularly limited thereto.

As the binder resin, more specifically, a non-particulate polymer binder may not be used but a particulate binder polymer may be used. When the particulate binder polymer is used, the polymer particles may have a D50 diameter of 500 nm or less. By not using a non-particulate binder polymer but using a particulate binder polymer, porosity in the heat-resistant layer can be secured. In addition, by using the particulate binder polymer having particle sizes in a predetermined numerical range, there is an advantage in that the resistance does not increase because the particulate binder polymer does not enter the pores of the porous polymer substrate. In addition, when the particulate binder polymer has a shell-type gel structure, the elastic force of the heat-resistant layer can be secured.

To this end, the particulate binder polymer may have a larger D50 diameter than the sizes of the pores of the porous polymer substrate. For example, the D50 diameter may be at least 80 nm, at least 90 nm, or at least 100 nm.

The particulate binder polymer is an acrylic particulate binder (for example, a copolymer of butyl acrylate and ethylhexyl acrylate, a copolymer of methyl methacrylate and ethylhexyl acrylate, a copolymer of polyacrylonitrile, polycyanoacrylate, butyl acrylate, and styrene, or the like), acrylonitrilebutadiene-styrene rubber, acrylonitrile-butadiene polyvinylidene fluoride, rubber, polyvinylchloride, polyvinylalcohol, polystyrene, or any mixture of two or compounds selected therefrom.

In a specific embodiment of the present disclosure, the inorganic particles usable in the heat-resistant layer are not particularly limited as long as they are electrochemically stable. The inorganic particles that can be used in the present disclosure are not particularly limited as long as oxidation and/or reduction reactions do not occur in the operating voltage range (for example, 0 V to 5 V based on Li/Li+) of the electrochemical device.

Non-limiting examples of the inorganic particles include $BaTiO_3$, $Pb(Zr,Ti)O_3$ (PZT), $b_{1-x}La_xZr_{1-y}Ti_yO_3$ (PLZT, $0<x<1$, $0<y<1$), $Pb(Mg_{1/3}Nb_{2/3})O_3$—$PbTiO_3$ (PMN-PT), hafnia ($HfO_2$), $SrTiO_3$, $SnO_2$, $CeO_2$, MgO, $Mg(OH)_2$, NiO, Cao, ZnO, $ZrO_2$, $SiO_2$, $Y_2O_3$, $Al_2O_3$, SiC, $Al(OH)_3$, $TiO_2$, aluminum zinc peroxide, tin hydroxide ($ZnSn(OH)_6$), tin-zinc oxide ($Zn_2SnO_4$, $ZnSnO_3$), antimony trioxide ($Sb_2O_3$), antimony tetraoxide ($Sb_2O_4$), antimony pentoxide ($Sb_2O_5$), etc. The inorganic particles may include one of these materials or two or more materials of the materials.

Independently or in combination with the components exemplified above, the inorganic particles may include inorganic particles having lithium ion transport capability. Non-limiting examples of the inorganic particles having such lithium ion transport ability include: $(LiAlTiP)_xO_y$ series glass ($0<x<4$, $0<y<13$) as lithium phosphate ($Li_3PO_4$), lithium titanium phosphate ($Li_xTi_y(PO_4)_3$, $0<x<2$, $0<y<3$), lithium aluminum titanium phosphate ($Li_xAl_yTi_z(PO_4)_3$, $0<x<2$, $0<y<1$, $0<z<3$), and $14Li_2O$-$9Al_2O_3$-$38TiO_2$-$39P_2O_5$, etc.; lithium lanthanum titanate ($Li_xLa_yTiO_3$, $0<x<2$, $0<y<3$); lithium germanium thiophosphate ($Li_xGe_yP_zS_w$, $0<x<4$, $0<y<1$, $0<z<1$, $0<w<5$) such as $Li_{3.25}Ge_{0.25}P_{0.75}S_4$, etc.; lithium nitride ($Li_xN_y$, $0<x<4$, $0<y<2$) such as $Li_3N$, etc.; $SiS_2$-containing glass ($Li_xSi_yS_z$, $0<x<3$, $0<y<2$, $0<z<4$) such as $Li_3PO_4$—$Li_2S$—$SiS_2$, etc.; $P_2S_5$-containing glass ($Li_xP_yS_z$, $0<x<3$, $0<y<3$, $0<z<7$) such as $LiI$—$Li_2S$—$P_2S_5$, etc.; and mixtures thereof.

In addition, the average diameter (D50) of the inorganic particles is not particularly limited, but is preferably in the range of 0.3 μm to 1 μm for the formation of a coating layer having a uniform thickness and an appropriate porosity. When the average diameter is smaller than 0.3 μm, the dispersibility of inorganic particles in the slurry prepared for the heat-resistant layer may be reduced. When the average diameter exceeds 1 μm, the thickness of the formed coating layer may increase.

In one embodiment of the present disclosure, for the formation of the heat-resistant layer, for example, a method described below may be used. First, a polymer solution is prepared by dissolving a binder resin in an appropriate organic solvent. As the solvent, preferably, a material having a solubility index similar to that of the binder polymer used and a low boiling point is used. This is to facilitate uniform mixing and subsequent solvent removal. Non-limiting examples of the solvent that can be used include acetone, tetrahydrofuran, methylene chloride, chloroform, dimethylformamide, N-methyl-2-pyrrolidone (NMP), cyclohexane, water, and a mixture thereof.

Next, inorganic particles are added and dispersed in the prepared polymer solution. In the present disclosure, the ratio of the inorganic particles to the binder is the same as described above, and is appropriately adjusted in consideration of the thickness, pore size, and porosity of the finally formed heat-resistant layer according to the present disclosure.

Next, the inorganic particle slurry prepared above is applied to at least one side of the separator and dried. A method of applying the slurry on the separator substrate is not particularly limited, and a conventional coating method known in the art may be used. For example, any known method such as dip coating, die coating, roll coating, comma coating, or a combination thereof may be used.

In the drying process, temperature and time conditions are appropriately set to minimize the occurrence of surface defects on the surface of the composite porous layer. For the drying, a drying auxiliary device such as a drying oven or hot air may be used within an appropriate scope.

In addition, the separator of the present disclosure can be manufactured by a method in which a heat-resistant layer and a separator substrate are separately prepared, these sheets are stacked, and the stack of the sheets becomes a composite structure through thermocompression bonding or using an adhesive. Examples of a method for obtaining the heat-resistant layer as an independent sheet include a method in which the slurry is applied on a release sheet, the heat-resistant layer is formed by the method described above, and only the heat-resistant layer is peeled off.

The present disclosure provides a secondary battery including the separator thus manufactured. The battery includes a negative electrode, a positive electrode, and a separator interposed between the negative electrode and the positive electrode. The separator is a low-resistance separator having the above-described characteristics.

In the present disclosure, the positive electrode includes a positive electrode current collector and a positive electrode active material layer provided on at least one surface of the positive electrode current collector, the positive electrode active material layer including a positive electrode active material, a conductive material, and a binder resin. The positive electrode active material may comprise one compound or a mixture of two or more compounds selected from: layered compounds or compounds with one or more transition metals, such as lithium manganese composite oxide ($LiMn_2O_4$, $LiMnO_2$), lithium cobalt oxide ($LiCoO_2$), and lithium nickel oxide ($LiNiO_2$); lithium manganese oxides represented by formula of $Li_{1+x}Mn_{2-x}O_4$ (here, x is in the range of 0 to 0.33), such as $LiMnO_3$, $LiMn_2O_3$, and $LiMnO_2$; lithium copper oxide ($Li_2CuO_2$); vanadium oxide such as $LiV_3O_8$, $LiV_3O_4$, $V_2O_5$, and $Cu_2V_2O_7$; Ni site lithium nickel oxide represented by formula of $LiNi_{1-x}M_xO_2$ (here, M=Co, Mn, Al, Cu, Fe, Mg, B or Ga, x=0.01 to 0.3); lithium manganese composite oxide represented by formula of $LiMn_{1-x}M_xO_2$ (M=Co, Ni, Fe, Cr, Zn, or Ta, x=0.01 to 0.1) or by formula of $Li_2Mn_3MO_8$ (M=Fe, Co, Ni, Cu, or Zn); $LiMn_2O_4$ in which Li is partially substituted with alkali earth metal ions; disulfide compounds; and $Fe_2(MoO_4)_3$.

In the present disclosure, the negative electrode includes a negative electrode current collector and a negative electrode active material layer provided on at least one surface of the negative electrode current collector, in which the negative electrode active material layer includes a negative electrode active material, a conductive material, and a binder resin. As the negative active material, the negative electrode comprises one material or a mixture of two or more materials selected from: carbon such as lithium metal oxide, non-graphitizable carbon, and graphitic carbon; silicon materials such as Si, $SiO_x$ (0<x<2), SiC, Si, etc.; metal composite oxides such as $Li_xFe_2O_3$ (0≤x≤1), $Li_xWO_2$ (0≤x≤1), $Sn_xMe_{1-x}Me'_yO_z$ (Me: Mn, Fe, Pb, or Ge; Me': Al, B, P, Si, elements of groups 1, 2, and 3 of the periodic table, or halogen; 0<x≤1; 1≤y<3; and 1≤z≤8); lithium metal; lithium alloy; silicon-containing alloy; tin-containing alloy; metal oxides such as Sno, $SnO_2$, PbO, PbO2, $Pb_2O_3$, $Pb_3O_4$, $Sb_2O_3$, $Sb_2O_4$, $Sb_2O_5$, GeO, $GeO_2$, $Bi_2O_3$, $Bi_2O_4$, and $Bi_2O_5$; conductive polymer such as polyacetylene; Li—Co—Ni-containing materials; and titanium oxides.

In a specific embodiment of the present disclosure, the conductive material is, for example, one material or a mixture of two or more materials selected from the group consisting of graphite, carbon black, carbon fiber or metal fiber, metal powder, conductive whisker, conductive metal oxide, carbon nanotubes, activated carbon, and polyphenylene derivatives.

The carbon nanotubes have a form in which a graphite sheet has a nano-sized cylinder shape, and has an sp2 bonding structure. The carbon nanotubes exhibit the characteristics of a conductor or the characteristics of a semiconductor according to a structure and an angle at which the graphite sheet is rolled. The carbon nanotubes may be categorized into single-walled carbon nanotubes (SWCNT), double-walled carbon nanotubes (DWCNT), and multi-walled carbon nanotubes (MWCNT) depending on the number of bonds forming the wall. These carbon nanotubes may be appropriately selected according to the use of the dispersion. More specifically, the conductive material may be one material or a mixture of two or more materials selected from the group consisting of natural graphite, artificial graphite, super-p, acetylene black, Ketjen black, channel black, furnace black, lamp black, summer black, Denka black, SWCNT, DWCNT, MWCNT, aluminum powder, nickel powder, zinc oxide, titanic acid Potassium, and titanium oxide.

The material of the current collector is not particularly limited as long as the material has high conductivity without causing chemical change in the battery. For example, stainless steel, aluminum, nickel, titanium, or fired carbon may be used. Alternatively, in the current collector, stainless steel or aluminum is used as a base material, and the surface of the base material may be treated with carbon, nickel, titanium, silver, or the like.

As the binder resin, r commonly used for electrodes in the art may be used. Non-limiting examples of such binder resin include polyvinylidene fluoride-co-hexafluoropropylene, polyvinylidene fluoride-co-trichloroethylene, polymethylmethacrylate, polyethylhexyl acrylate, polybutylacrylate, polyacrylonitrile, polyvinylpyrrolidone, polyvinylacetate, polyethylene-co-vinyl acetate, polyethylene oxide, polyarylate, cellulose acetate, cellulose acetate butyrate, cellulose acetate propionate, cyanoethylpullulan, cyanoethylpolyvinylalcohol, cyanoethylcellulose, cyanoethylsucrose, pullulan, and carboxyl methyl cellulose, but examples of the material usable as the binder rein are not limited thereto. As the binder resin, more specifically, non-particulate binder polymer may not be used but particulate binder polymer may be used. The particulate binder resin may have a D50 diameter of 500 nm or less. When such a particulate binder polymer is used, since the binder polymer does not enter the pores of the electrode active material layer, the resistance of the electrode is not increased. In addition, since the particulate binder resin has a shell-type gel structure, the elasticity of the electrode active material may be secured.

To this end, the particulate binder polymer has a D50 diameter larger than the power side of the electrode active material. For example, the D50 diameter may be 80 nm or more, 90 nm or more, or 100 nm or more.

The particulate binder polymer may be any one material or a mixture of two or more materials selected from among an acrylate-containing binder (for example, a copolymer of butyl acrylate and ethylhexyl acrylate, a copolymer of methyl methacrylate and ethylhexyl acrylate, a copolymer of polyacrylonitrile, polycyanoacrylate, butyl acrylate, and styrene, etc.), acrylonitrilebutadiene-styrene rubber, styrene butadiene rubber (SBR), acrylonitrile-butadiene rubber, polyvinylchloride, polyvinylidene fluoride, polyvinylalcohol, and polystyrene.

More specifically, the binder used for the negative electrode may be styrene butadiene rubber (SBR), and the binder used for the positive electrode may be polyvinylchloride.

The electrode assembly prepared as described above may be inserted into an appropriate case and an electrolyte may be injected into the case to manufacture a battery.

In the present disclosure, the electrolyte is a salt in the form of $A^+B^-$. $A^+$ may be an alkali metal cation such as $Li^+$, $Na^+$, or $K^+$ or a combination thereof. $B^-$ is an anion such as $PF_6^-$, $BF_4^-$, $Cl^-$, $Br^-$, $I^-$, $ClO_4^-$, $AsF_6^-$, $CH_3CO_2^-$, $CF_3SO_3^-$, $N(CF_3SO_2)_2^-$, or $C(CF_2SO_2)_3^-$, or a combination thereof. The salt composed of such A+ ions and B− ions may be dissolved or dissociated in an organic solvent such as propylene carbonate (PC), ethylene carbonate (EC), diethyl carbonate (DEC), dimethyl carbonate (DMC), dipropyl carbonate (DPC), dimethyl sulfoxide, acetonitrile, dimethoxyethane, diethoxyethane, tetrahydrofuran, N-methyl-2-pyrrolidone (NMP), ethylmethyl carbonate (EMC), γ-butyrolactone, or a mixture thereof. However, the present disclosure is not limited thereto.

In addition, the present disclosure provides a battery module including a battery including the electrode assembly as a unit cell, a battery pack including the battery module, and a device including the battery pack as a power supply. Specific examples of the device include, but are not limited to, power tools powered for operation by an electric motor; electric vehicles including electric vehicle (EVs), hybrid electric vehicles (HEVs), plug-in hybrid electric vehicles (PHEVs), and the like; electric two-wheeled vehicles including electric bicycles (E-bikes) and electric scooters (E-scooter); electric golf carts; and power storage systems.

Hereinafter, examples will be given to describe the present disclosure in detail. The examples according to the present invention described below may be modified into various forms, so that the scope of the present disclosure should not be construed as being limited to the examples described in detail below. The examples are provided to aid those skilled in the art to more easily understand the present disclosure.

1. Fabrication of Separator Substrate

Example 1-1

30 parts by weight of polyethylene resin (Mw 475, 500 g/mol, PDI 4.5, MI 1.7 g/10 min, manufactured by Korea Petrochemical Industry Corporation) and 70 parts by weight of liquid paraffin oil (kinematic viscosity at 40° C.: 40 cSt) were introduced into a twin-screw extruder, kneaded, and then extruded. After the extrusion, the extruded object passed through a T-die and a cooling casting roll to form a sheet, followed by sequential stretching (MD stretching+TD stretching) with a tenter-type sequential stretching machine. Liquid paraffin oil as a pore former (diluent) was extracted from the stretched sheet with the use of methylene chloride, and the sheet underwent thermal setting at about 128° C. to produce a separator substrate.

Example 1-2

A separator substrate was obtained by performing the same procedure as in Example 1-1 except that polyethylene resin (Mw 250,000 g/mol, PDI 3.7, MI 2.1 g/10 min) was used.

Example 1-3

A separator substrate was obtained by performing the same procedure as in Example 1-1 except that polyethylene resin (Mw 620,000 g/mol, PDI 4.5, MI 0.5 g/10 min) was used.

Example 1-4

A separator substrate was obtained by performing the same procedure as in Example 1-1 except that polyethylene resin (Mw 800,000 g/mol, PDI 5.4, MI 0.2 g/10 min) was used.

Example 1-5

A separator substrate was obtained by performing the same procedure as in Example 1-1 except that a polyethylene resin composition with a PDI value of 10.0 and an MI of 1.2 g/10 min was used, in which the polyethylene resin composition contained 70 parts by weight of a first polyethylene resin (Mw 250,000 g/mol, PDI 3.8, MI 2.1 g/10 min) and 30 parts by weight of a second polyethylene resin (Mw 620,000 g/mol, PDI 4.5, MI 0.5 g/10 min).

Example 1-6

A separator substrate was obtained by performing the same procedure as in Example 1-1 except that a polyethylene resin composition with a PDI value of 11.0 and an MI of 1.08 g/10 min was used, in which the polyethylene resin composition contained 60 parts by weight of a first polyethylene resin (Mw 250,000 g/mol, PDI 3.8, MI 2.1 g/10 min) and 40 parts by weight of a second polyethylene resin (Mw 620,000 g/mol, PDI 4.5, MI 0.5 g/10 min).

Example 1-7

A separator substrate was obtained by performing the same procedure as in Example 1-1 except that a polyethylene resin composition with a PDI value of 12.0 and an MI of 0.9 g/10 min was used, in which the polyethylene resin composition contained 50 parts by weight of a first polyethylene resin (Mw 250,000 g/mol, PDI 3.8, MI 2.1 g/10 min) and 50 parts by weight of a second polyethylene resin (Mw 620,000 g/mol, PDI 4.5, MI 0.5 g/10 min).

Example 1-8

A first separator substrate was obtained by performing the same procedure as in Example 1-1 except that a separator substrate has a thickness of 1 μm.

A second separator substrate was obtained by performing the same procedure as in Example 1-2 except that a separator substrate has a thickness of 10 μm.

The first separator substrate was respectively laminated on both sides of the second separator substrate to obtain a multilayer separator substrate having a final thickness of 12 μm.

Comparative Example 1-1

A polyethylene resin composition was prepared by mixing 60 parts by weight of a first polyethylene resin (having a weight average molecular weight (Mw) of 250,000 g/mol, PDI 3.8, MI 2.1 manufactured by Korea Petrochemical Industry g/10 min, Corporation) and 40 parts by weight of a second polyethylene resin (having a weight average molecular weight (Mw) of 800,000 g/mol, PDI 5.4, MI 0.3 g/10 min, manufactured by Korea Petrochemical Industry Corporation). The polyethylene resin composition had a weight average molecular weight (Mw) of 497,000 g/mol, a PDI value of 12.8, and an MI of 0.32 g/10 min. Next, a separator substrate was obtained in the same manner as in Example 1-1 described above.

Comparative Example 1-2

A separator substrate was obtained by performing the same procedure as in Example 1-1 except that a polyethylene resin with a weight average molecular weight (Mw) of 1,900,000, a PDI value of 12.1, and an MI of 0.01 g/10 min was used.

Comparative Example 1-3

A separator substrate was obtained by performing the same procedure as in Example 1-1 except that a polyethylene resin with a weight average molecular weight (Mw) of 1,950,000, a PDI value of 12.5, and an MI of 0.01 g/10 min was used.

The properties of the separator substrates obtained in Examples and Comparative Examples are as shown in Table 1 and Table 2 below. In the case of Comparative Examples 1-2 and 1-4, film formation was poor, and the film thickness was not uniform.

TABLE 1

| | Example 1-1 | Example 1-2 | Example 1-3 | Example 1-4 | Example 1-5 |
|---|---|---|---|---|---|
| Resin PDI | 4.5 | 3.8 | 6.5 | 9.0 | 10.0 |
| Average pore size (nm) | 27 | 27 | 26 | 26 | 28 |
| Wet curve maximum pressure (psi) | 303 | 300 | 309 | 318 | 323 |
| Wet curve minimum pressure (psi) | 219 | 225 | 220 | 225 | 227 |
| Wet curve pressure difference (psi) | 84 | 75 | 89 | 93 | 96 |
| Dielectric breakdown voltage (V) | 1850 | 1901 | 1844 | 1790 | 1788 |
| Pre-press thickness (μm) | 9 | 9 | 9 | 9 | 9 |
| Post-press thickness (um) | 8.5 | 8.6 | 8.5 | 8.5 | 8.5 |
| Thickness change (%) by press | 5.6 | 4.4 | 5.6 | 5.6 | 5.6 |
| Pre-press permeability (sec/100 cc) | 80 | 78 | 82 | 85 | 86 |
| Post-press permeability (sec/100 cc) | 105 | 98 | 107 | 108 | 108 |
| Permeability change (%) by press | 31.3 | 25.6 | 30.5 | 27.1 | 25.6 |
| Pre-press ER (2) | 0.38 | 0.37 | 0.39 | 0.39 | 0.41 |
| Post-press ER (2) | 0.42 | 0.41 | 0.44 | 0.44 | 0.47 |
| ER change (%) by press | 10.5 | 10.8 | 12.8 | 12.8 | 14.6 |

TABLE 2

| | Example 1-6 | Example 1-7 | Example 1-8 | Comparative Example 1-1 | Comparative Example 1-2 | Comparative Example 1-3 |
|---|---|---|---|---|---|---|
| Resin PDI | 11.0 | 12.0 | — | 12.8 | 12.1 | 12.5 |
| Average pore size (nm) | 29 | 29 | 27 | 28 | 27 | 28 |
| Wet curve maximum pressure (psi) | 327 | 330 | 305 | 290 | 411 | 429 |
| Wet curve minimum pressure (psi) | 229 | 230 | 219 | 145 | 257 | 263 |
| Wet curve pressure difference (psi) | 98 | 100 | 86 | 145 | 154 | 166 |
| Dielectric breakdown voltage (V) | 1634 | 1631 | 1845 | 370 | 384 | 389 |
| Pre-press thickness (μm) | 9 | 9 | 12 | 10 | 12 | 12 |
| Post-press thickness (μm) | 8.4 | 8.3 | 11.4 | 8.0 | 11.6 | 11.7 |
| Thickness change (%) by press | 6.7 | 7.8 | 5.0 | 20 | 3.3 | 2.5 |
| Pre-press permeability (sec/100 cc) | 86 | 88 | 81 | 91 | 92 | 94 |
| Post-press permeability (sec/100 cc) | 110 | 114 | 106 | 419.5 | 425 | 440 |

TABLE 2-continued

|  | Example 1-6 | Example 1-7 | Example 1-8 | Comparative Example 1-1 | Comparative Example 1-2 | Comparative Example 1-3 |
|---|---|---|---|---|---|---|
| Permeability change (%) by press | 27.9 | 29.5 | 30.9 | 361 | 362 | 368.1 |
| Pre-press ER (Ω) | 0.41 | 0.42 | 0.39 | 0.80 | 1.11 | 1.14 |
| Post-press ER (Ω) | 0.48 | 0.50 | 0.43 | 2.176 | 2.68 | 2.72 |
| ER change (%) by press | 17.1 | 19.0 | 10.3 | 172 | 141 | 139 |

2. Evaluation of Physical Properties of Separator Substrate (1) Molecular Weight Measurement The weight average molecular weight (Mw) and the number average molecular weight (Mn) were by gel permeation chromatography (GPC: PL GPC220, Agilent Technologies) under the following conditions:

Column: PL Olexis (Polymer Laboratories)
Solvent: trichlorobenzene (TCB)
Flow rate: 1.0 ml/min
Sample concentration: 1.0 mg/ml
Injection volume: 200 μl
Column temperature: 160° C.
Detector: Agilent High Temperature RI detector
Standard: Polystyrene (calibrated with a cubic function)

(2) Wet Curve Measurement Method

A Galwick solution was prepared, and the separator substrates obtained in Example and Comparative Example were immersed in the solution for 1 minute. Thereafter, a wet curve of each of the separator substrate impregnated with the solution was obtained using a capillary flow porometer, the maximum and minimum pressures were measured, and the difference between the minimum and maximum pressures was calculated. In the test, the measurement pressure was set to be in the range of 0 to 3500 MPa. The measurement method using the capillary flow porometer method was performed with PMI equipment (Porous Materials Inc.).

(3) Measurement of Change in Electric Resistance (ER)

With respect to the separator substrates obtained in Example and Comparative Example, a current of 1 mA was applied using HiTester manufactured by Hioki, and electric resistance was measured for each separator substrate. Each separator substrate was hot-pressed at 90° C. and 4 MPa for 1 second, and then the electric resistance was measured. The resistance change rate (%) for each separator substrate was calculated by [Equation 2] below.

$$\text{(ER of separator substrate after pressing–ER of separator base before pressing)/ER of separator base before pressing} \times 100(\%) \quad \text{[Equation 2]}$$

(4) Average Pore Size

A pore size distribution was obtained using the capillary flow porometer method, and the average pore size (nm) was calculated from the pore size distribution. The measurement method using the capillary flow porometer method was performed with PMI equipment (Porous Materials Inc.).

(5) Measurement of Change in Air Permeability

With respect to the separator substrates obtained in Example and Comparative Example, porosity and air permeability were measured with EG01-55-1MR equipment manufactured by Asahi Seico Corporation.

Each separator substrate was hot-pressed at 90° C. and 4 MPa for 1 second, and then the air permeability was measured. The air permeability change rate (%) for each separator substrate was calculated by [Equation 3] below.

$$[(\text{Initial air permeability–Air permeability after pressing})/\text{Initial air permeability}] \times 100 \quad \text{[Equation 3]}$$

(6) Thickness Strain

The thickness was measured for each of the separator substrates obtained in Example and Comparative Example. Each separator substrate was hot-pressed at 90° C. and 4 MPa for 1 second, and then the thickness was measured. The thickness strain (%) for each separator substrate was calculated by [Equation 4] below.

$$[(\text{Initial thickness–Thickness after pressing})/\text{Initial thickness}] \times 100 \quad \text{[Equation 4]}$$

It was confirmed that the thickness change rate of the separator substrate of Example was lower than that of Comparative Example.

(7) Dielectric Breakdown Voltage

In each of the Example and Comparative Example, 30 specimens were prepared and their withstand voltage characteristics were evaluated. For example, after hot-press bonding a stainless steel mesh and the separator substrate under conditions of 70° C., 7.8 MPa, and 10 seconds, the DC current is set to 0.5 mA, and the voltage increase is set to 100 V/s (voltage 3 kV, and ramp up time 3 seconds). When the test started, the measurement was completed when a short circuit occurred in each specimen while the voltage was raised, and the voltage at that time was measured as the breakdown voltage. Through Weibull analysis for all of the specimens tested, the voltages indicated by the lower 1% specimens exhibiting low breakdown voltage were measured. The results are summarized in Table 1.

As confirmed through this experiment, the separator substrate obtained in Example has pores that are small and uniform in size and thus has excellent withstanding voltage characteristics and thickness strain compared to the separator substrate obtained in Comparative Example.

3. Fabrication of Unit Cell

Example 2-1

First, the separator substrate prepared in Example 1-1 was prepared.

Then, aluminum hydroxide (average particle diameter: 800 nm, manufactured by Huber Corporation) as inorganic particles and poly(ethylene glycol)-block-poly(acrylic acid) (manufactured by BYK company) as a dispersant were put into water and homogeneously stirred at room temperature. Next, particulate binder polymers, an acrylic particulate binder (styrene-butyl acrylate, LGC, AD-S11, D50: 400 nm) and a copolymer (Tg 40° C.) of styrene and butyl acrylate were sequentially added thereto to prepare a slurry for forming a heat-resistant layer. The weight ratio of the inorganic particles and the particulate binder polymer in the slurry was 85:15. In addition, the weight ratio of the inorganic particles and the dispersant was 99.5:0.5. Using a doctor blade, the slurry was applied to one surface of the separator substrate prepared in Example 1-1 and dried to prepare a separator having a heat-resistant layer.

Next, $LiNi_{0.8}Co_{0.1}Mn_{0.1}O_2$, PVdF, and carbon black were mixed in a weight ratio of 97.0:1.5:1.5, and the mixture was dispersed in 2-methyl-2-pyrrolidone to prepare a positive electrode slurry. The positive electrode slurry was applied to an aluminum current collector, dried, and rolled to prepare a positive electrode.

Next, graphite, SBR, and CMC were mixed in a weight ratio of 89.2:10:0.8 and dispersed in distilled water to prepare a negative electrode slurry. The negative electrode slurry was applied to a copper current collector, dried, and rolled to prepare a negative electrode.

The separator having the heat-resistant layer was disposed between the positive electrode and the negative electrode prepared as described above. This was laminated to prepare an electrode membrane assembly. This assembly and electrolyte were then packaged into a pouch form. The electrolyte was a 1.0 M $LiPF_6$ solution, which is a mixed solution of ethylene carbonate (EC) and ethylmethyl carbonate mixed in a volume ratio of 20:80.

Comparative Example 2-1

A unit cell was prepared in the same manner as in Example 2-1, except that the separator prepared in Comparative Example 1-1 was used as the separator substrate.

What is claimed is:

1. A separator substrate for an electrochemical device, comprising:
   a sheet-shaped porous membrane having a plurality of pores, and comprising a polymer material,
   wherein the polymer material comprises 90 wt % or more of a polyolefin-containing resin based on 100 wt % of the polymer material,
   wherein the polymer material has a weight average molecular weight (Mw) in a range of 250,000 g/mol to 800,000 g/mol,
   wherein the separator substrate comprises fibrils having a diameter of 50 nm to 250 nm, space present between the fibrils forms pores, and the separator substrate has a porosity of 30 vol % to 65 vol %,
   wherein the separator substrate has a difference of 100 psi or less between a maximum pressure and a minimum pressure in a wet curve measurement, and
   wherein the polymer material has a polydispersity index (PDI) value ranging from 3.8 to 12.0.

2. The separator substrate of claim 1, wherein the separator substrate has a thickness in a range of 5 μm to 50 μm.

3. The separator substrate of claim 1, wherein the polyolefin-containing resin is present in an amount of 100 wt % based on 100 wt % of the polymer material.

4. The separator substrate of claim 1, wherein the polyolefin-containing resin comprises at least one selected from the group consisting of polyethylene, polypropylene, polybutylene, and polypentene.

5. The separator substrate of claim 1, wherein the polymer material comprises polyethylene, wherein the polyethylene having a PDI value in a range of 3.8 to 12.0 is present in an amount of 90 wt % or more based on 100 wt % of the polymer material.

6. The separator substrate of claim 1, wherein the PDI value of the polymer material is in a range of 5.4 to 10.0.

7. The separator substrate of claim 6, wherein the polymer material comprises polyethylene, wherein the polyethylene having a PDI value in a range of 5.4 to 10.0 is present in an amount of 90 wt % or more based on 100 wt % of the polymer material.

8. A separator for an electrochemical device, the separator comprising:
   the separator substrate of claim 1; and
   a heat-resistant layer on one or both surfaces of the separator substrate,
   wherein the heat-resistant layer comprises a binder resin and inorganic particles.

9. The separator of claim 8, wherein the binder resin comprises a particulate binder polymer.

10. An electrochemical device, comprising:
    a negative electrode;
    a positive electrode; and
    the separator of claim 8,
    wherein the separator is present between the negative electrode and the positive electrode.

* * * * *